United States Patent [19]

Domoleczny et al.

[11] 4,358,792
[45] Nov. 9, 1982

[54] PRECISION SCREEN ELEVATING AND CONTROL MEANS FOR A PROJECTION TELEVISION RECEIVER

[75] Inventors: James D. Domoleczny, Vernon Hills; Raymond D. Y. Loh, Skokie; Hans E. Manske, Addison; Joseph N. Marchese, Norridge; Carl A. Michelotti, Barrington, all of Ill.

[73] Assignee: Zenith Radio Corporation, Glenview, Ill.

[21] Appl. No.: 235,059

[22] Filed: Feb. 17, 1981

[51] Int. Cl.³ .............................................. H04N 5/64
[52] U.S. Cl. .................................... 358/254; 358/237
[58] Field of Search ................................ 358/254, 237

[56] References Cited

U.S. PATENT DOCUMENTS 4,245,256 1/1981 Kokubo et al. ..................... 358/254

Primary Examiner—Richard Murray
Attorney, Agent, or Firm—Ralph E. Clarke, Jr.

[57] ABSTRACT

An ultra-compact projection television receiver is disclosed comprising in combination cabinet means for enclosing the receiver components including a vertically reciprocable, rear projection viewing screen selectively storable in the cabinet. Precision elevating means provides for raising and lowering the screen between a stored position in the cabinet and a receiver-operable viewing wherein the screen is emerged. A television system has an ON control mode for providing television sound and pictures and an OFF control mode. Control means coupled to the elevating means and the television system provide for sensing the position of the screen in its reciprocation, and obstructions to said reciprocation manifested by increased resistance to said reciprocation, and correlatively controlling the elevating means and the OFF/ON control modes of the television system in response thereto. The control means are programmed to cause the screen to rise smoothly to its raised position without an abrupt stop and pictures to appear and sound to be heard the instant the raised position is attained. Safety is enhanced as obstructions to screen reciprocation are sensed and the reciprocation is stopped. The receiver is caused to automatically place the television system in the OFF mode when the screen is stored.

6 Claims, 10 Drawing Figures

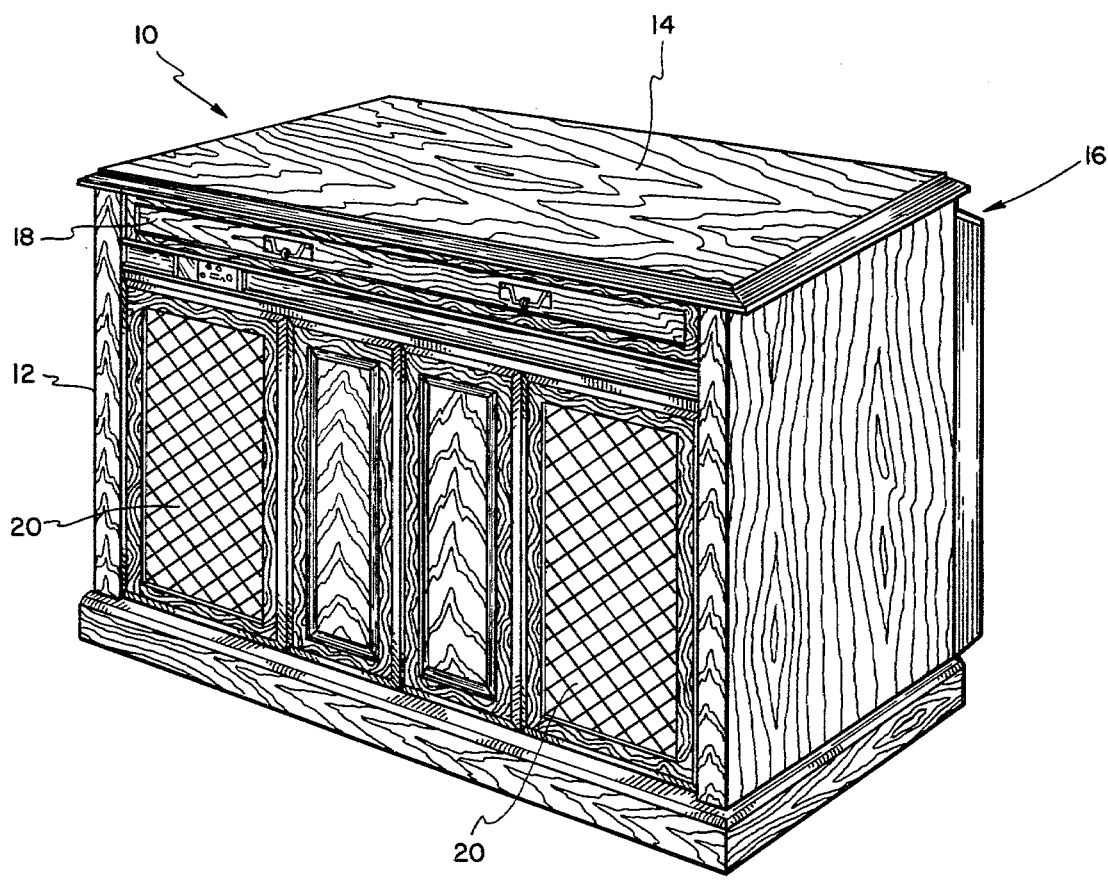
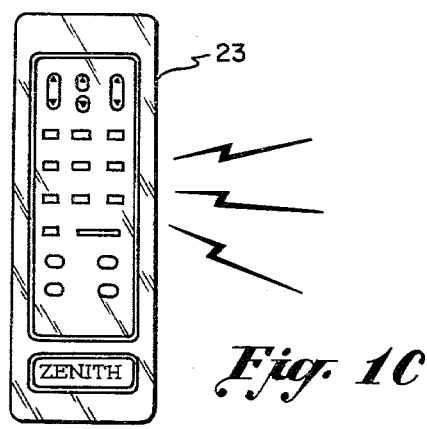
Fig. 1A
Fig. 1C

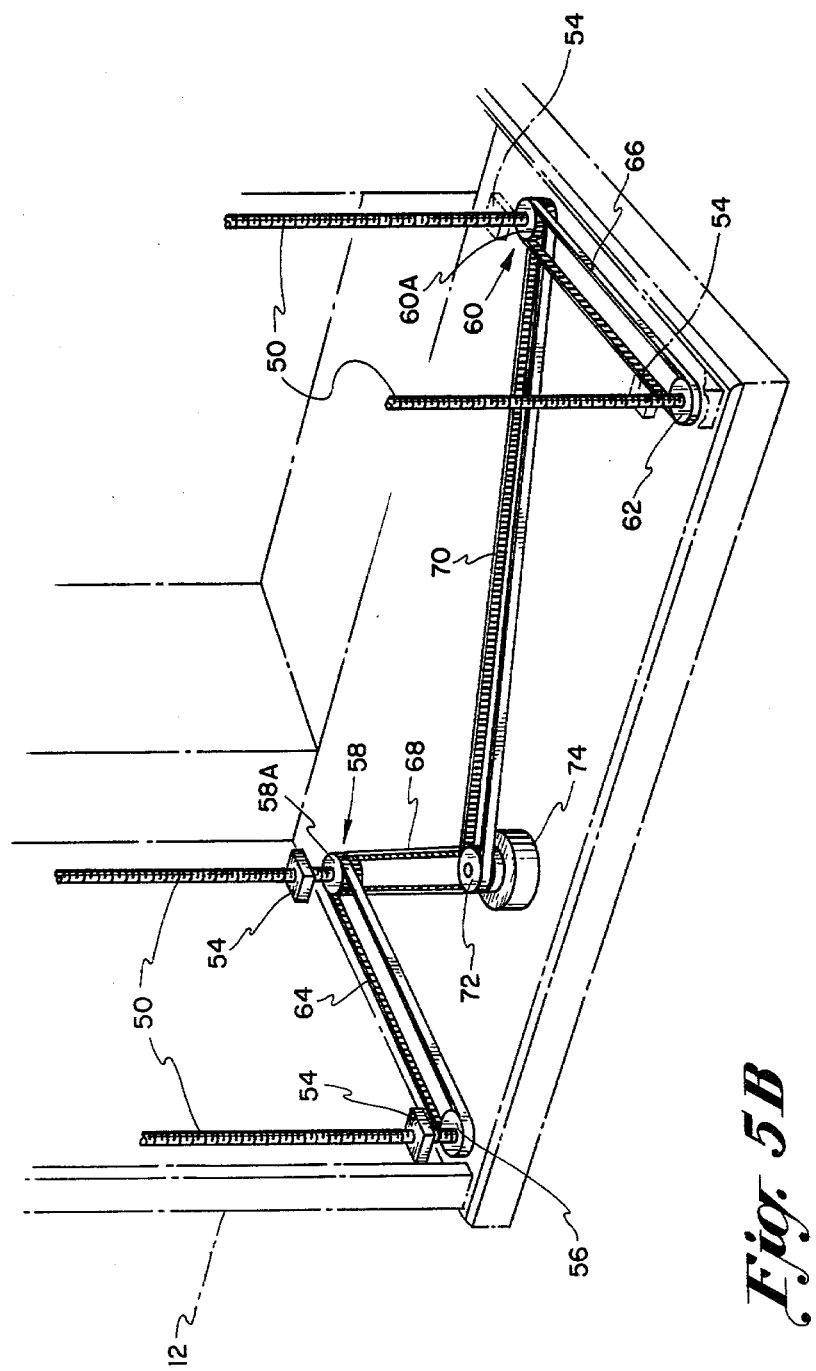

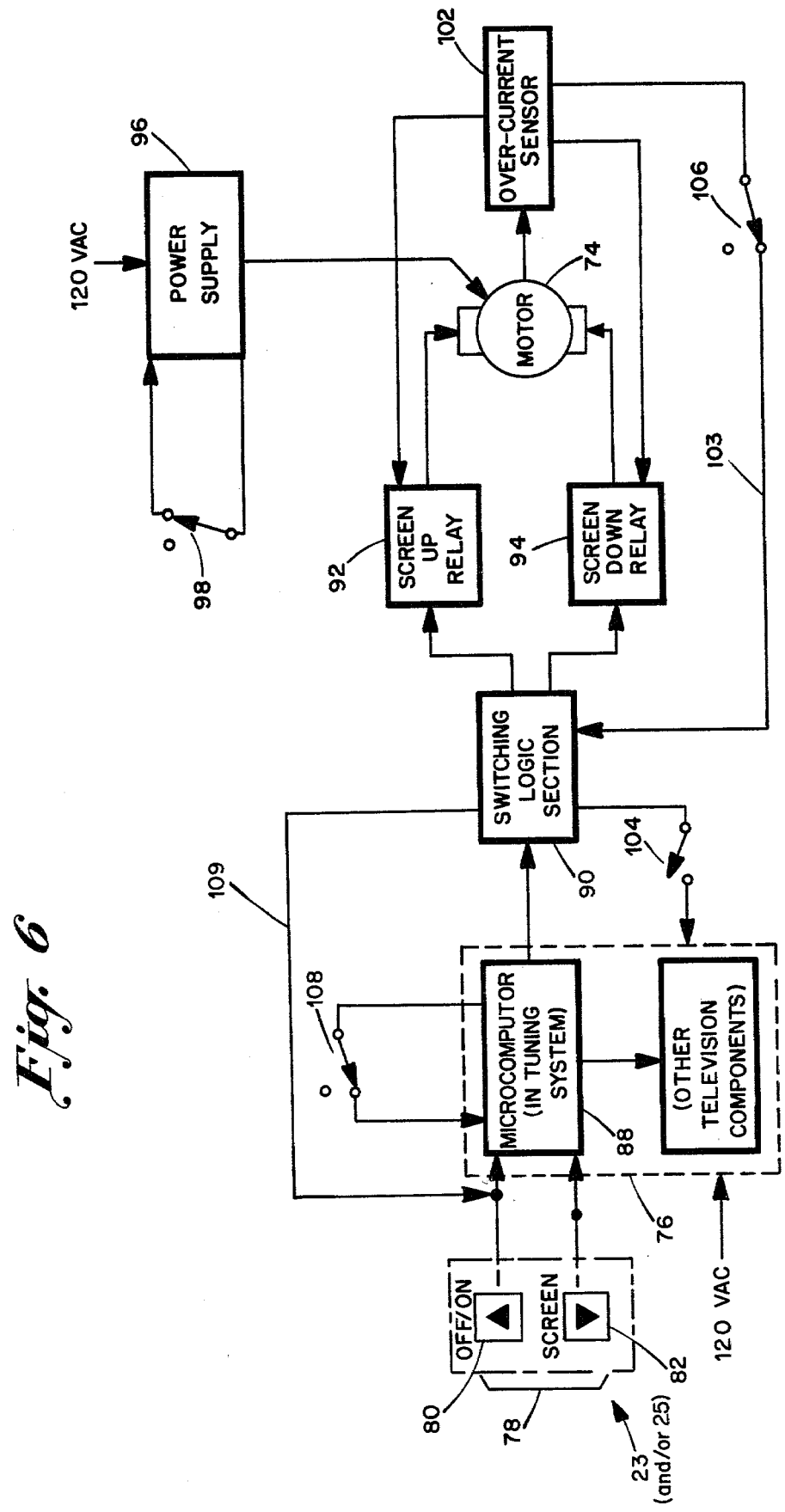

PRECISION SCREEN ELEVATING AND CONTROL MEANS FOR A PROJECTION TELEVISION RECEIVER

CROSS-REFERENCE TO RELATED APPLICATIONS

This application is related to but in no way dependent upon copending application of common ownership herewith including: Ser. No. 228,434 filed Jan. 26, 1981; Ser. No. 258,206 filed May 27, 1981; Ser. No. 259,333 filed May 30, 1981; Ser. No. 314,591 filed Oct. 26, 1981; Ser. No. 238,861 filed Feb. 27, 1981; Ser. No. 297,885 filed Aug. 31, 1981; Ser. No. 107,732 filed Feb. 19, 1980; and Ser. No. 277,493 filed June 26, 1981.

BACKGROUND OF THE INVENTION AND PRIOR ART STATEMENT

This invention concerns television systems, and is particularly directed to a system in which a rear projection screen, storable in the system cabinet, is elevatable for viewing.

A system of this type is described and claimed in referent copending application Ser. No. 228,434. An ultra-compact, jack-in-the-box projection television receiver comprises cabinet means for enclosing components of the receiver and lid means hinged at the back of the cabinet. The receiver has vertically arranged, elevatable rear projection screen means selectively storable in the cabinet. Means are included for lifting the lid and elevating the screen from a first, receiver-inoperable position wherein the screen is stored in the cabinet and the receiver is substantially as compact as a conventional, large-screen console television receiver, to a second, elevated receiver-operable position wherein the screen is emerged from the cabinet. When the screen is in the second elevated receiver-operable position, the receiver is capable of displaying an image with an area greater than three times the image area on the conventional console television receiver.

An optical path for the projection television receiver described in the foregoing is disclosed in referent copending application Ser. No. 258,206. An image source means for forming a television image includes stationary image projection means permanently stored in the aforedescribed cabinet for projecting an aerial image of the television image along a path folded by optical path folding means onto the aforedescribed screen. The projection can take place when the screen is erected and located a predetermined image projection distance from the image source means. When the screen is elevated, the optical path is extended to a length equal to the predetermined image projection distance, and the projection image is coincident with the screen.

A screw-propelled mechanism known in the manufacturing art provides for lifting and lowering printed circuit boards between an upper electrical test station and a lower insertion/removal station. Means are provided for detecting the presence of boards at either station and reversing the direction of traverse.

The present invention provides for elevating the screen from a first receiver-inoperable position wherein the screen is lowered and stored in the cabinet and the receiver is ultra-compact, to an elevated receiver-operable position wherein the screen is emerged from the cabinet.

OBJECT OF THE INVENTION

It is the object of this invention to provide effective means for elevating and lowering the viewing screen with respect to the cabinet of the ultra-compact projection television receiver described and claimed in referent copending application Ser. No. 228,434.

BRIEF DESCRIPTION OF THE DRAWINGS

The appended claims set forth those novel features believed characteristic of the invention. However, the invention itself, as well as further objects and advantages thereof, will best be understood by reference to the following detailed description of a preferred embodiment taken in conjunction with the accompanying drawings, in which:

FIGS. 1A, and 1B and 1C are oblique views in perspective of a projection television receiver depicting, respectively, a first receiver-inoperable position, and a second receiver-operable position wherein a rear-projection screen is elevated from the receiver cabinet;

FIG. 5B is a view similar to FIG. 5A but with the floor of the cabinet shown as being removed to depict additional details of the precision elevating means according to the invention; and, FIG. 6 is a view in perspective of the essentials of another embodiment of screen elevating means according to the invention.

DESCRIPTION OF THE PREFERRED EMBODIMENT

Figure 1B:
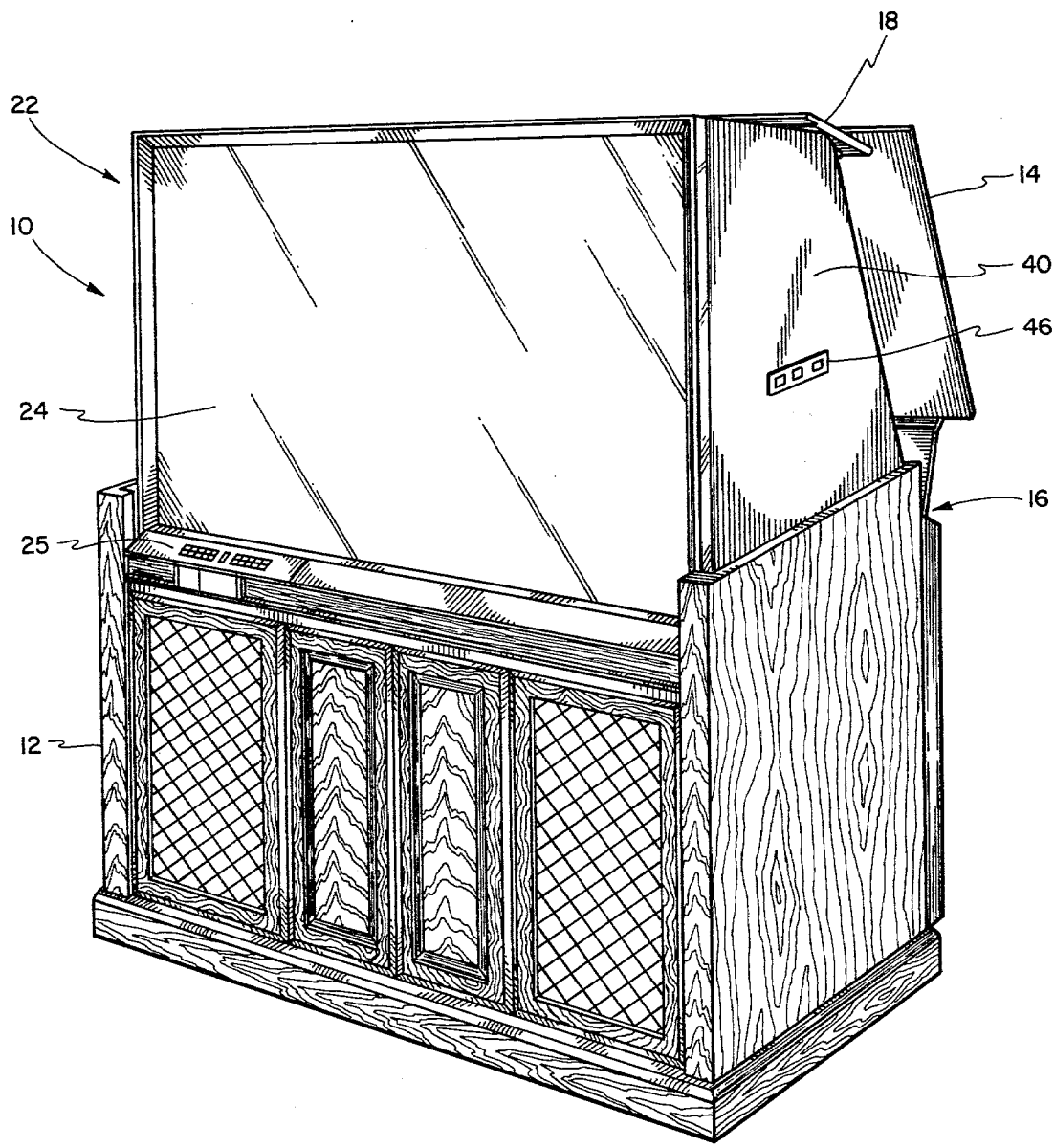

An ultra-compact, jack-in-the-box projection television receiver 10 according to the invention described and claimed in referent copending application Ser. No. 228,434 is shown by FIG. 1A. The receiver comprises cabinet means 12 for enclosing the components of the receiver. Cabinet 12 includes lid means 14 attached to the back of the cabinet and pivoted by a hinge 16 which may comprise a piano hinge, for example. The lid 14 may have an overhanging control panel cover 18 for covering a receiver control panel. Grilled aperture ports 20 provide for audio emission from concealed speakers of, for example, a stereo sound system.

With specific reference to FIG. 1B, lid 14 is shown as being raised and elevatable rear projection screen means 24 with enclosing frame is shown as being emerged from cabinet means 12. The rear projection viewing screen 24 is shown as being vertically arranged for displaying a television image. Control panel 25, which may include all standard front panel controls such as controls for channel selection, audio volume, and various chromatic controls, and control means such as control means according to the invention for elevating and lowering screen 24, is exposed by the raising of control panel cover 18 when lid 14 is raised. Control panel cover 18 may be hingedly dependent from lid 14, as indicated. Control panel cover 18 is described and claimed in referent copending application Ser. No. 259,333. Remote control means 23, indicated in FIG. 1C as being a hand-held unit, may be linked to control circuits in receiver 10 by acoustic or infra-red means, for example, and may provide controls similar to those located on control panel 25.

Figure 2:
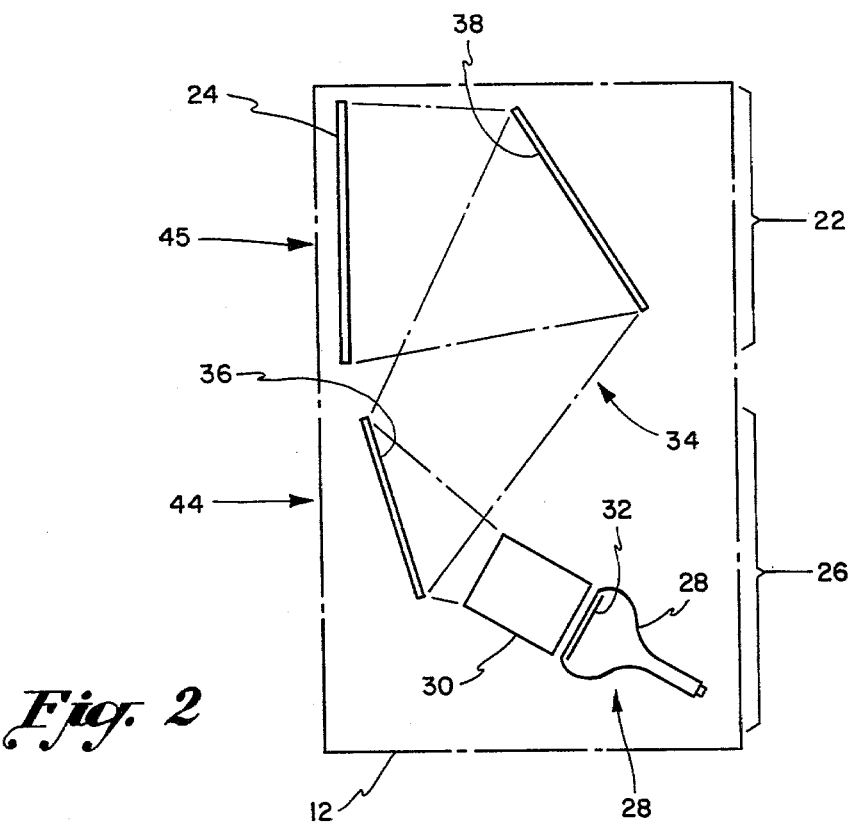
FIG. 2 is a schematic view of the components of the optical path of the receiver when the screen is elevated, in relation to the receiver cabinet, shown as an outline.
Figure 3:
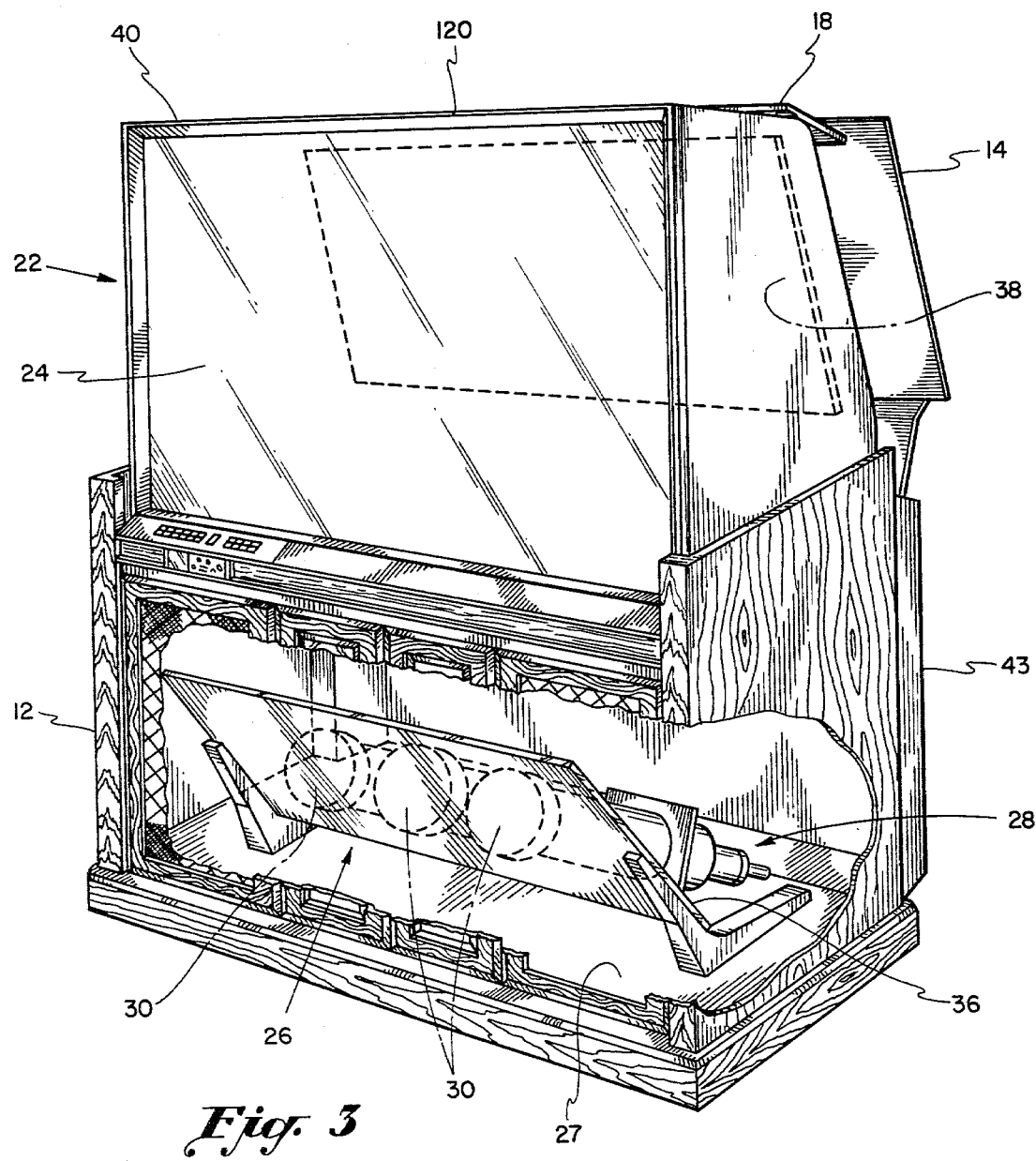
FIG. 3 is an oblique view in perspective depicting the receiver with screen elevated and with the receiver cabinet partially cut away to show major components.

The major components comprising the television receiver are depicted highly schematically in FIG. 2 and in a cutaway perspective view in FIG. 3. Image source means 26 for forming a television image is permanently enclosed in a lower portion the cabinet as indicated by the bracket, and is depicted as being mounted on the floor 27 of cabinet 12. Image source means 26 is indicated as comprising three cathode ray tubes 28. The cathode ray tubes 28 may each develop, respectively, a red, green, or blue image for projecting in conjunction with stationary image projection means 30 an aerial image of a television image formed by image source means 26. The image is projected along a folded optical path 34 onto screen 24 when the optical path is erected and screen 24 is located at a predetermined image projection distance from image source means 26. A television image 32 is depicted in FIG. 2 as being formed on the cathodoluminescent screen of one of the cathode ray tubes. The image source means 26 includes first mirror means 36 which provides for receiving the aerial image and reflecting the image upwardly. The image source means 26 is fully described and claimed in referent copending application Ser. No. 314,591. The elevatable unitary optical assembly 22 indicated by the bracket in FIG. 2 includes rear projection screen 24 for displaying the projected television image 32. A second mirror means 38 provides for receiving the image reflected from first mirror 36, and is arranged to reflect the image forwardly toward screen 24. Rigid, box-like shroud means 40 supports screen 24 and the second mirror 38 to form the unitary optical assembly 22. Shroud 40 also provides for shielding mirror 38 and the rear surface 42 of screen 24 from image-contrast-reducing ambient light. Cabinet extension 43 provides additional space for enclosing shroud 40 when the unitary optical assembly 22 is stored. The unitary optical assembly 22 is described and fully claimed in referent copending application Ser. No. 238,861.

The angular orientations of second mirror 38 are made adjustable to ensure that the projection image, which follows the folded optical path 34, can be kept in coincidence with screen 24. The adjustment means 46 are conveniently made accessible by their location on the side of shroud 40, as depicted in FIG. 2. The adjustment means are fully described and claimed in referent copending application Ser. No. (D4282).

Figure 4A:
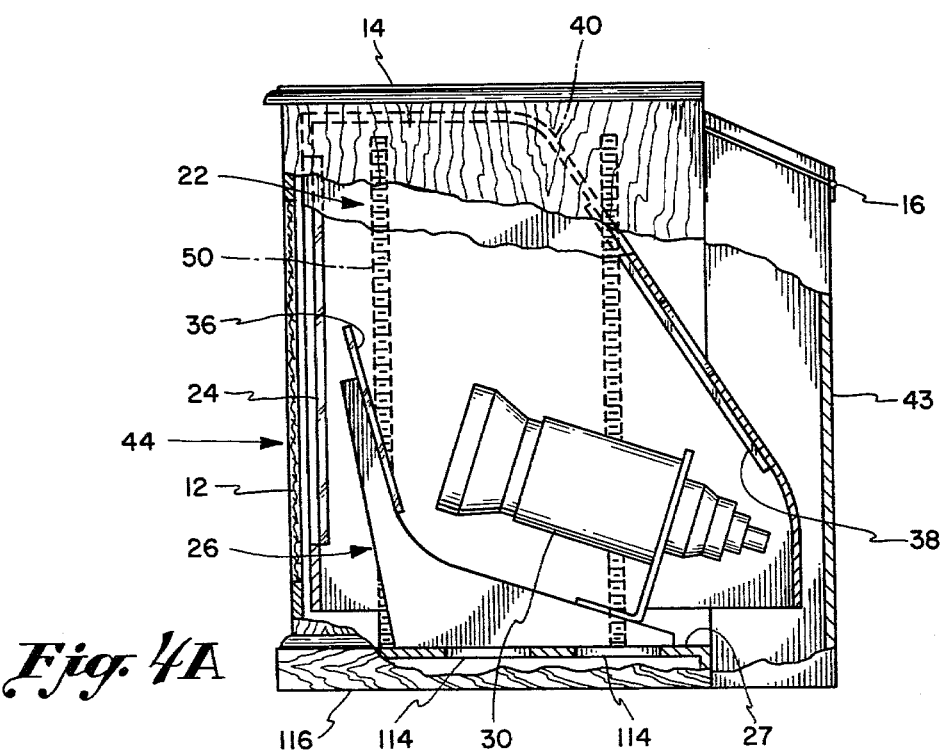
FIGS. 4A and 4B are views in elevation wherein the receiver cabinet is cut away to show the relationship of major receiver components with the elevating means according to the invention.
Figure 4B:
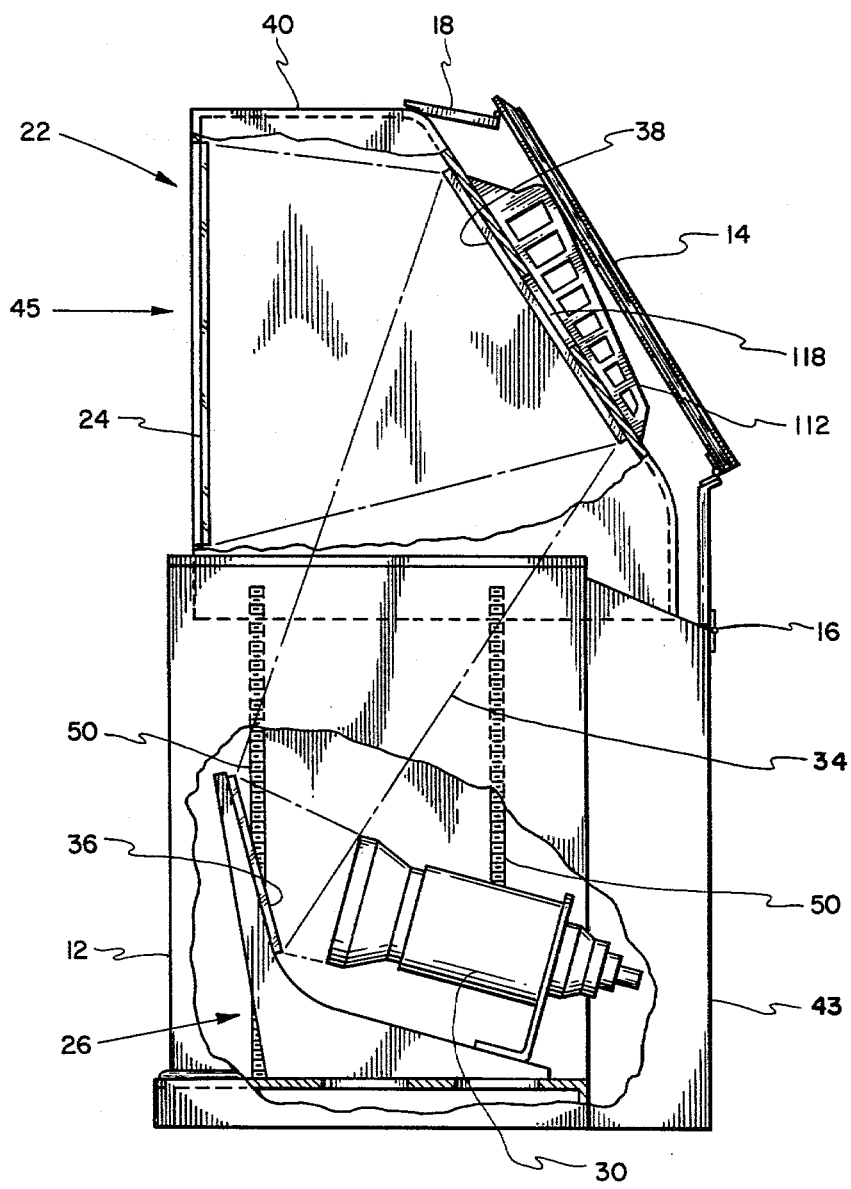

FIG. 4A shows the elevatable unitary optical assembly 22, which includes screen 24, second mirror 38 and shroud 40, in a first receiver-inoperable position 44 wherein the assembly and screen means 24 is stored in cabinet 12. Means according to the present invention are provided for raising lid 14 and elevating unitary optical assembly 22 to an elevated receiver-operable position wherein the unitary optical assembly 22 is emerged from cabinet 12, as depicted by FIGS. 1B, 3 and 4B. The optical path is thus extended to a length equal to the predetermined image projection distance and the projection image is coincident with the screen 24.

Figure 5A:
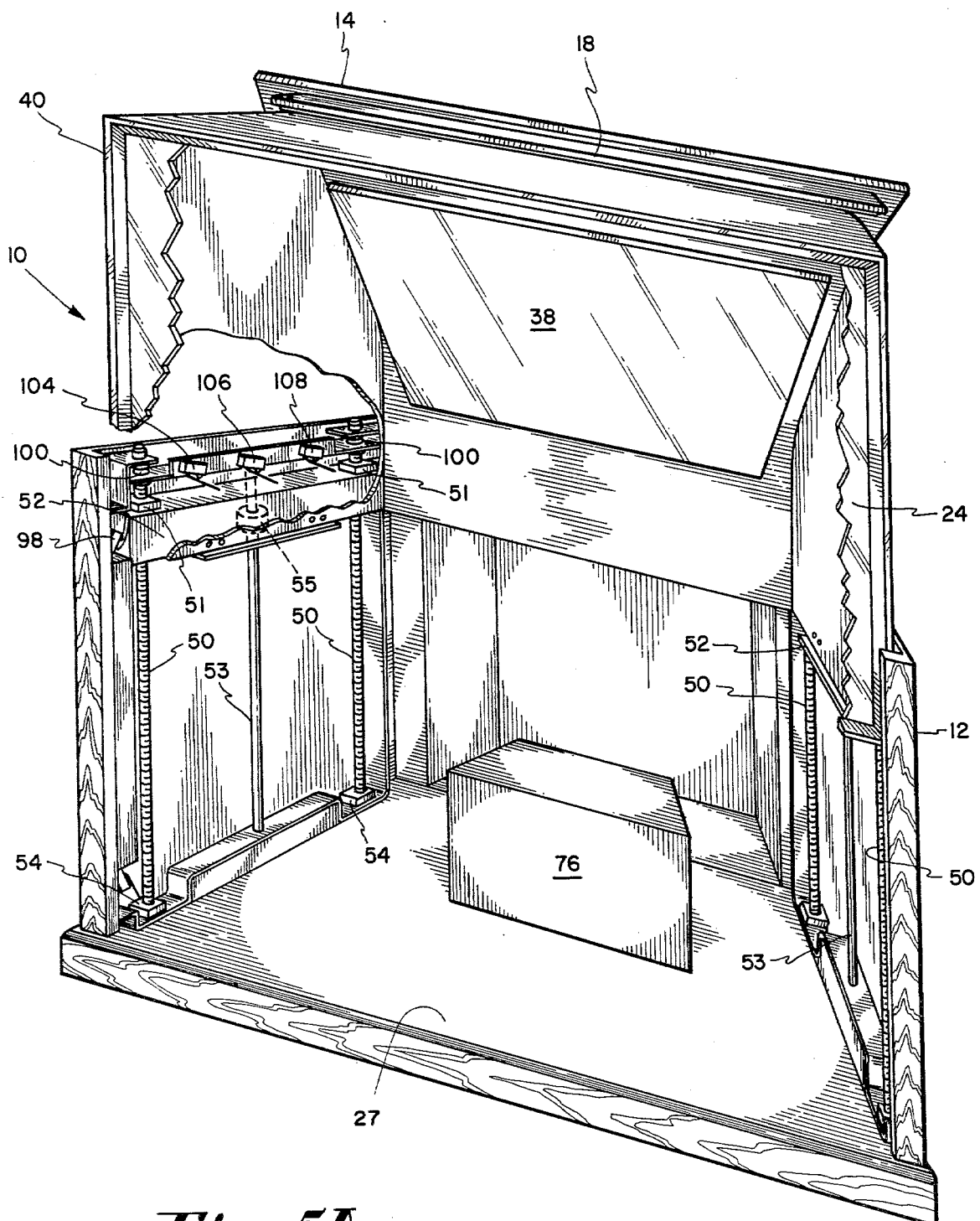
FIG. 5A is a view in perspective with the front of the receiver cabinet cut away to show details of a preferred embodiment of the precision elevating means according to the invention.

A preferred embodiment of the precision elevating means according to the invention for elevating and lowering unitary optical assembly 22 and rear-projection screen 24 is shown by FIGS. 5A and 5B. Shroud 40 is shown as cut away at the left-hand side of FIG. 5A to show details of the precision elevating means according to the invention. A substantially identical, mirror-image assembly having the same elevating function is located on the opposite side of cabinet 12. The use of the plural form in part designation in the following paragraph indicates that there is an identical member at the opposite end of the cabinet having the same function.

At least two vertically oriented, vertically stabilized screen means 50, shown as being four screen means in this preferred embodiment, provide for elevating and lowering screen 24. Screw means 50 may, by way of example, comprise triple-lead, rolled threads having a diameter of about five-eighths of an inch, and a length of about thirty-one inches. Thread pitch is about eight threads per inch. Associated screw-follower means 51 are attached to shroud mounting members 52 to which shroud 40 is in turn attached. Thrust bearings 54 provide for receiving the vertical thrust of screw means 50. Shroud 40 may be attached to the shroud mounting members 52 by machine screws.

A plurality of vertical guide rods 53, indicated as being two guide rods in this example, oriented in parallel with screw means 50, are enclosed by linear motion bearings 55, attached in turn to shroud mounting members 52. Bearings 55 are indicated as being located behind members 52, as indicated by the dash line configuration. Bearings 55 may be of the recirculating ball bearing type, for example. Alternately, the linear motion bearings 55 may comprise sleeve-like sections of Delrin (R) attached to the associated shroud mounting member 52, and having a tight-tolerance hole therethrough for accepting the associated guide rods 53. Guide rods 53 provide for stabilizing unitary optical assembly 22 as it is raised and lowered by the precision elevating means according to the invention. The mountings attached to the shroud mounting members 52, and which retain the screw follower means 51, are designed to allow the screw follower means to "float"; that is, to move transversely with little restriction. As a result, shroud mounting members 52, and the unitary optical assembly 22 attached thereto, are vertically stabilized solely by the guide rods 53 during the reciprocation of the screen 24. The floating mounts effectively prevent binding during screen reciprocation, and help ensure vertical stability of the screen 24 during its raising and lowering.

Screw means 50 are caused to rotate in unison by power train means which may be of the design indicated in FIG. 5B. The power train in the preferred embodiment depicted, includes four screw-rotating pulleys 56, 58, 60 and 62, each of which is keyed to the associated screw means 50. It will be observed that the screw means located in the rear of the cabinet 12 are caused to rotate in unison with the screw means located at the front of the cabinet by synchronous belt means 64 and 66, which engage a second tier 58A and 60A of screw rotating pulleys 58 and 60, respectively. The second tiers 58A and 60A of screw rotating pulleys 58 and 60 are in turn caused to rotate in unison by synchronous drive belts 68 and 70, which are driven in turn by two-tier synchronous pulley 72 keyed to the rotating output shaft of drive motor 74. Except for drive motor 74, the entire power train assembly is preferably located beneath the floor 62 of cabinet 12, as indicated by FIG. 5B.

Motor 74 is preferably of a type that provides twenty inch/pounds of starting and running torque. Motor 74 may be of the kind supplied by von Weise Gear Comany, St. Louis, Missouri under the designation type No. VO3300AA31, or an equivalent. Power consumption of this motor is 150-200 watts when supplied with 24 volts direct current. Speed of rotation may be, for example, about 250 rpm. A heat-sensitive relay switch preferably provides for thermal cut out upon overload. A reversible permanent magnet motor having similar operating specifications, but operating from 107 volts average direct current (120 VAC rectified), and consuming only 85-100 watts, can as well be used. This motor can be of the type manufactured by von Weise Gear Company under the designation Type No. VO33-00AB31, or an equivalent. Power consumption of this motor is in the range of 85-100 watts.

Projection television receiver 10 also includes a television system having an ON control mode for providing television sound and television images for display on screen 24 when screen 24 is emerged from cabinet 12. The television system also includes an OFF control mode for turning off the aforesaid sound and images. The television system 76 is indicated highly schematically by the block in the center of the cabinet toward the back wall in FIG. 5. Television system 76 should be considered as having well-known-in-the-art television components and stages including a standard tuner, video if amplifiers, video detector, a luminance channel, sweepcircuits, and in color receivers, a chrominance channel, all of which cooperate to act as a television image source means 26 in conjunction with one or more cathode ray tubes 28. In addition, television system 76 preferably has a tuning system which includes a microcomputer, as will be described. The audio signal processing means of the television system 76 provides for detecting the audio component of the composite video signal following the video if amplifier stage. The detected audio signal is amplified by an audio amplifier means which in turn drives one or more speakers (not shown).

The precision elevating means according to the invention includes control means coupled to the elevating means and to the television system 76 for sensing the position of screen 24 and obstructions to the screen in its reciprocation, and correlatively controlling the elevating means and the ON/OFF control modes of television system 76 in response thereto. The presence of obstructions is manifested by increased resistance to screen elevating and lowering. The control of television system 76, and the lifting and lowering of screen 24 is preferably initiated either by activating controls on the control panel 25 of receiver 10, or the keypad on the hand-held control unit 23 located remotely from receiver 10 shown in FIG. 6, which is a functional block diagram of the control means according to the invention. Screen control means 78 may comprise, by way of example, a push-button switch 80 designated OFF/ON and having an upwardly oriented arrowhead, which provides for turning the television system 76 on and elevating screen 24. Screen control means 78 also may comprise, by way of example, a push-button 82 designated SCREEN with a downwardly oriented arrowhead for lowering screen 24.

The physical location of the various means for sensing the position of screen 24, whether it is in the raised position, lowered position, or in reciprocation therebetween, is shown by FIG. 5A wherein the sensing means 98, 104, 106, and 108 are depicted as lever-actuated switches. The sensing means may comprise, by way of example, single-pole, double-throw snap-action switches either normally closed or normally open and actuated by levers extending therefrom for detecting the position or passing of one or both shroud mounting members 52 to which shroud 40 and associated screen 24 is attached. The sensing means could as well comprise magnetically activated reed switches or other proximity switch devices that provide for making or breaking electrical circuits. Additionally, some or all of the sensing means 98, 104, 106 and 108, shown as being positioned at the left end of cabinet 12, could as well be located at the opposite end of the cabinet.

With reference to FIG. 6, elevating screen 24 from a lowered, receiver-inoperable position wherein screen 24 is stored in cabinet 12, and a raised, receiver-operable position wherein screen 24 is emerged from cabinet 12 for display of television pictures, is initiated by depressing OFF/ON pushbutton switch 80. A microcomputer 88, which is part of the tuning system, sends a pulse to the switching logic section 90, which determines that the screen 24 is in the stored position. A pulse is sent to the screen-up relay 92 by logic section 90, closing the relay contacts to supply power to motor 74. The forward rotation of motor 74 activates the aforedescribed power train, resulting in the elevating of screen 24 to the fully raised position.

Lowering of screen 24 to the receiver-inoperable position wherein the screen is stored in cabinet 12 is initiated by depressing SCREEN pushbutton switch 82. The activation of SCREEN switch 82 causes the microcomputer 88 to send a pulse to the switching logic section 90, wherein a determination is made that screen 24 is in raised position. Screen down relay 94 is then activated, resulting in a reversal of the rotation of motor 74 and the lowering of screen 24. Concurrently, television system 76 is turned off.

The tuning system, of which the microcomputer 88 is a part, is an electronic, microcomputer-controlled television tuning system capable of acquiring channels offset by as much as 3.25 MHz from the designated frequency while also being able to accurately tune in channels operating at the designated frequency. After synthesizing the correct channel frequency, athe microcomputer looks at AFC discriminator information from which local oscillator tuning voltage direction is determined. To achieve automatic fine tuning, the tuning voltage is then stepped by the microcomputer in small frequency increments which vary from 28 KHz for channel 2 to 80 KHz for channel 80 in the direction of the desired frequency until the center video carrier frequency is passed. The tuning voltage is then returned to the preceding step to which frequency the receiver is then locked. With essentially all broadcasting stations operating at, or very close to, the FCC-designated frequency, highly accurate tuning to the selected channel is thus permitted. Video carrier verification is accomplished by microcomputer analysis of AFC discriminator and vertical sync states. The tuning system is described and claimed in referent copending application Ser. No. 107,732. The microcomputer is a four-bit, E/D MOS unit with a read-only memory, a random access memory, an arithmetic logic unit, input/output ports, and a clock generator, all on a single semiconductor chip. The microcomputer chip is one of the MN1400 series basic design as manufactured by Matshushita Electronics Corporation, and especially modified for the referent '732 application.

Switching logic section 90 is an elementary logic unit that responds to the means for sensing the raised and lowered positions of screen 24 for stopping and reversing motor 74 at the respective positions. It responds to pulses from the microcomputer and emits command logic pulses, and also has other elementary logic circuit functions as will be described.

Screen up relay 92 and screen down relay 94 provide for control of the direction of rotation of motor 74. Switching logic section 90 determines the proper direction of rotation of motor 74 and activates either screen up relay 92 or screen down relay 94. Relays 92 and 94 are electrically latched and are activated upon receiving a latching pulse, and remain latched until an unlatching pulse is received.

Means are provided for sensing the proximity of screen 24 to the raised position and controlling the speed of motor 24 for slowing the rate of elevating whereby screen 24 does not come to an abrupt stop. The slowing of motor 74 is accomplished by reducing the voltage to motor 74 from the power supply 96. Power supply 96 may comprise, for example, a transformer for reducing 120 VAC to 24 VAC, and a four-diode bridge circuit to provide full-wave rectification for supplying 24 VDC for motor 74 operation. Sensing means 98, indicated as comprising a normally closed switch, is depicted in FIG. 5 as being located near the top of the excursion of shroud mounting member 52. The passing of shroud mounting member 52 by sensing means 98 activates, for example, a lever extending from sensing means 98. As a result, the contacts of sensing means switch 98, which are in series connection with one leg of the full-wave rectifier, open. Thus, the output of power supply 96 is effectively halved to 12 VDC, for example, and motor 74 rotates at approximately half speed, thus slowing the rate of rise of screen 24. The stopping of screen 24 is preferably further gentled by spring shock absorber means 100, depicted as being located at the limit of topmost excursion of shroud mounting members 52. Power supply 96 also supplies 12 VDC for operation of relays 92 and 94 and other components of the control means.

As noted, a reversible permanent-magnet motor operating from 120 VDC can as well be used. In this case, power supply 96 is designed to rectify 120 VAC to supply 107 volts average direct current for full-speed operation of the motor, and about 55 volts average direct current for operation of the motor at half speed.

When screen 24 is lowering, motor 74 is preferably programmed to run at half speed because the weight of the unitary optical assembly 22, which includes the screen, accelerates the rate of lowering appears to the eye to be about equal to the rate of rise of the screen under full motor speed.

Over-current sensor 102 provides for sensing an obstruction to the elevating and lowering of screen 24, manifested by increased resistance to elevating and lowering, and in conjunction with the control means, provides for turning off motor 74 and television system 76 in response. Sensor 102 operates by sensing the magnitude of the current drawn by motor 74. Sensor 102 may comprise, for example, a resistor (not shown) in series with the winding of motor 74. A separate bipolar transistor switch normally in saturation is in series with each of the relay coil windings of relays 92 and 94. When an obstruction to the elevating or lowering of screen 24 is encountered, such as a heavy weight on lid 14 when screen 24 is emerging, resistance to the elevating or lowering increases, and the resulting overcurrent drawn by motor 74 develops a voltage across the associated current-sensing resistor which is used to bias the transistor to cut off, unlatching screen up relay 92 and shutting off the current to motor 74. Upon removal of the obstruction, the OFF/ON pushbutton 80 can be activated to reinstitute elevation of the screen. Conversely, if an obstruction to the lowering of screen 24 is sensed, when the obstruction is removed, the SCREEN pushbutton 82 can be depressed to provide for a continuation of excursion of screen 24 in the downward direction.

Over-current sensor 102 also provides for sensing the raised and lowered positions of screen 24, and for stopping screen excursion and reversing motor 74 at the upper and lower limit positions by a signal sent through signal path 103. Switching logic section 90 provides for selecting the proper relay, whether screen up relay 92 or screen down relay 94, when either limit position is reached.

Means are provided for sensing the raising of screen 24 from the lowered position and activating the ON control mode of the television system 76, such that when screen 24 attains the raised position, television pictures will be instantly seen and sound will be heard. When OFF/ON switching means is activated to elevate the screen 24, as has been described, the microcomputer 88 also sends a turn-on pulse to the TV system 76. Concurrently, the normally closed contacts of switch 104, still in closed position provide for disabling the raster circuit and muting the sound circuits of the television system 76. When screen 24 attains the raised position, switch 104 opens, and the raster and sound are restored so that sound is heard and pictures are seen the instant the screen attains the raised position. Also, the time required to elevate screen 24 to the raised position is adequate for the filaments of the cathode ray tubes 28 to reach operating temperature.

It will be seen from FIG. 5 that switch 104 is indicated as being located at the top of the excursion of screen 24, along with sensing means switches 106 and 108. One or more of the switches can as well be mounted at the sides of the path of reciprocation of shroud mounting means 52.

Means are provided for detecting the raised position of screen 24, and in conjunction with control means, providing for the OFF/ON control of the television system 76 only by the OFF/ON control means. The benefit is that the television system 76 can be turned on or off by means of the OFF/ON switch 80 without going through the cycle of lowering and raising screen 24. This is accomplished by means of normally closed switch 106. When screen 24 attains the raised position, sensor 102 detects the overcurrent condition and unlatches the screen relay 92 to stop motor 74. Switch 106 opens concurrently to disable operation of the screen elevating function of OFF/ON switch 80, so switch 80 controls only the OFF/ON modes of television system 76.

Means are provided for detecting the lowered position of screen 24, and in conjunction with the control means, providing for turning off motor 74 so screen 24 does not rise during an automatic programming mode. For example, the user may program the receiver to turn on at a certain time. If the user is absent and the screen is stored in cabinet 12, the receiver will not turn on and the screen will not emerge although the receiver is in the automatic programming mode. This disabling is accomplished by sensing means 108, which has been noted as being located at the top of the reciprocation of screen 24. The lowering of the screen causes the normally closed contacts of switch 108 to open. The opening of the contacts is noted by the microcomputer 88 which had been previously programmed for automatic programming. In this case, the ON control mode of the television system 76 is disabled and the screen will not emerge.

Means are provided for sensing the lowered position of screen 24 and activating the OFF control mode of television system 76 so the television system cannot come on when screen 24 is stored. (It is to be noted that the television system is turned on, but the receiver is without picture and sound when screen 24 begins elevating, as described heretofore). As screen 24 lowers for storing and reaches the lowered position, the over-current drawn by motor 74 is detected by over-current sensor 102. A signal pulse is sent to the switching logic section 90 through signal path 103 and switch 106, noted as being normally closed except when screen 24 is in the raised position. A signal pulse is sent to the microcomputer 88 through path 109, which in turn places and holds the television system 76 in the OFF control mode until OFF/ON switch 80 is again depressed.

Means are provided to prevent the lowering of screen 24 should the television system 76 not turn off when the SCREEN (down) 80 is depressed. The storing of the screen, and the closing of the cabinet when the television system 76 is ON and the cathode ray tubes 28 are active, could result in a damaging build-up of heat within the cabinet. The application of 120 VAC power to the components of television system 76 is through the normally closed contacts of a latching relay switch (not shown) under the control of the microcomputer 88. Activating OFF/ON pushbutton switch 80 causes microcomputer 88 to latch the relay on, routing 120 volts to the other television components. Normally, when the SCREEN (down) pushbutton switch 82 is depressed, the relay is unlatched by the microcomputer and the television set is turned off. Simultaneously, microcomputer 88 sends a pulse to switching logic section 90, which in turn causes the activation of screen down relay 94. However, if screen 24 starts its downward excursion and television system 74 is not turned off—a condition which could be caused by the welding together of the contacts of the latching relay—logic section 90 will ignore the pulse from the microcomputer 88 and prevent screen down relay 94 from being activated.

The precision elevating means according to the invention provides for raising and lowering lid 14. A track 112 (please refer to FIG. 4B) is located on the outside surface of the shroud 40. A track-follower means (not shown) is attached to the inner surface of lid 14. As shroud 40 is elevated and lowered, the track follower rides on the track 112 so that there is no friction between lid 14 and shroud 40 during elevating and lowering of screen 24. Also, the lid-lifting means prevents the lid 14 from falling backwards as the shroud 40 is elevated. Further, the track is contoured to provide an initial quick rise of the lid as the screen emerges from the cabinet 12. The lid lifting means is described and claimed in referent copending application Ser. No. 277,493.

The elevating of screen 24 from a stored, first receiver-inoperable position wherein the unitary optical assembly 22 and associated screen 24 is emerged from cabinet 12 results in a large influx of air into cabinet 12, and when screen 24 is lowered for storing, a large efflux of air. The volume of air entering or leaving cabinet 12 is considerable—about six cubic feet—and the rate of flow is about twenty-four cubic feet per minute on the basis that fifteen seconds is allotted for the full excursion of the screen 24 out of, or into, cabinet 12. To provide for the unimpeded passage of air, a series of capacious vents 114 are provided in cabinet 12, preferably in the floor 27 of cabinet 12, as indicated in FIG. 4A. A vent 118 may also be provided on the slanted upper surface of shroud 40, as indicated.

The affinity of particulate matter to electronic and optical components, especially those operating adjacent to high potentials and at elevated temperatures, is well known. To remove as many contaminants as possible from the air entering the cabinet, it is desirable to provide filter means in vents 114 and 118; these can be of the well known spun-glas type such as used in hot air furnaces.

Exemplary dimensional heighth (H), width (W) and depth (D) values of the cabinet 12 of the projection television receiver 10 are listed as follows. It is to be recognized that the values are by way of example only, and are intended to be in no way limiting. The dimensional values are in inches.

Cabinet (12)
  Screen stored: 31H×44W×19.5D
  Height, screen elevated: 58
Cabinet Extension (41)
  26.5 H×42W×8.5D
Lid (14)
  44W×20D
Control Panel Cover (18)
  6H×38W
Unitary Optical Assembly (22)
  Shroud (40)
  22H×40W
  Depth, at top: 12
  Depth, at bottom: 23.5
  Screen (24)
  Diagonal Measure: 45
Total vertical reciprocation: about 24

While particular embodiments of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention.

We claim:

1. In an ultra-compact projection television receiver, the combination comprising:
   cabinet means for enclosing receiver components including a vertically reciprocable rear projection viewing screen selectively storable therein;
   precision elevating means for raising and lowering said screen between a lowered, receiver-inoperable position wherein said screen is stored in said cabinet, and a raised, receiver-operable viewing position wherein said screen is emerged from said cabinet;
   a television system having an ON control mode for providing television sound and television pictures for display on said screen when said screen is emerged, and an OFF control mode for turning off said sound and pictures;

control means coupled to said elevating means and said television system for sensing the position of said screen in its reciprocation and obstructions to said reciprocation manifested by increased resistance to said reciprocation, and correlatively controlling said elevating means and the OFF/ON control modes of said television system in response thereto; said control means being programmed to cause said screen to rise smoothly to its raised position without an abrupt stop, and such that pictures appear and sound is heard when the raised position is attained, safety is enhanced as obstructions to screen reciprocation are sensed and said reciprocation is stopped, and such that the receiver is caused to automatically place the television system in the OFF mode when the screen is stored.

2. In an ultra-compact projection television receiver, the combination comprising:

cabinet means for enclosing receiver components including a vertically reciprocable rear projection viewing screen selectively storable therein;

precision elevating means driven by a reversible, adjustable-speed motor for reciprocating said screen between a lowered, receiver-inoperable position wherein said screen is stored in said cabinet, and a raised, receiver-operable viewing position wherein said screen is emerged from said cabinet;

a television system having an ON control mode for providing television sound and television pictures for display on said screen when said screen is emerged, and an OFF control mode for turning off said sound and pictures.

control means coupled to said elevating means and said television system for sensing the position of said screen in its reciprocation and obstructions to said reciprocation and correlatively controlling said elevating means and the OFF/ON control modes of said television system, said control means including:

means for sensing the raising of said screen from said lowered position and activating said television ON control mode;

means for sensing an obstruction to the elevating and lowering of said screen manifested by increased resistance to said elevating and lowering, and means for turning off said television system and said motor in response;

means for sensing the proximity of said screen to said raised position and controlling the speed of said motor for slowing the rate of said raising;

means for detecting the raised position of said screen and providing for OFF/ON control of only said television system by control means, whereby said television system can be turned ON or OFF without lowering said screen;

means for sensing said raised and lowered positions of said screen and control means for stopping and reversing said motor at said positions;

means for sensing said lowered position of said screen and activating said OFF control mode of said television system; and means for detecting the lowered position of said screen and control means for turnig off said motor so that said screen does not rise during an automatic programming mode;

said control means being programmed to cause pictures to be seen and sound to be heard when said raised position is attained, safety is enhanced as obstructions to screen reciprocation are sensed and said reciprocation is stopped, said screen is caused to rise smoothly to its raised position without an abrupt stop, and said television system is off when said screen is in lowered position.

3. In an ultra-compact projection television receiver, the combination comprising:

cabinet means for enclosing receiver components, including a vertically reciprocable rear projection viewing screen selectively storable therein;

a television system for providing television sound and television pictures for display on said screen when said screen is emerged;

precision elevating means for raising and lowering said screen, said elevating means comprising:

at least two vertically oriented, vertically stabilized screw means located on opposite ends of said cabinet, said screw means mating with associated screw follower means attached to said elevatable screen assembly;

thrust bearing means for receiving the vertical thrust of said screw means;

rotative power train means for causing said screw means to rotate in unison;

a plurality of vertically oriented guide rods in parallel relation to said screw means for stabilizing said elevatable screen assembly in its vertical reciprocation;

reversible motor means for driving said power train means for elevating and lowering said screen assembly;

such that said screen is caused to reciprocate between a lowered, receiver-inoperable position wherein said screen is stored in said cabinet, and a raised, receiver-operable position wherein said screen is emerged from said cabinet for display of said pictures.

4. The receiver as defined by claim 3 wherein said screw means of said elevating means comprises four screws, two of which are located at each of said ends of said cabinet.

5. In an ultra-compact projection television receiver, the combination comprising:

cabinet means for enclosing receiver components including a vertically arranged vertically reciprocable unitary optical assembly including a rear-projection viewing screen selectively storable therein;

image source means for forming television images including stationary image projection means for projecting an aerial image of said television images formed by said image source means along a folded optical path onto said screen when said path is erected, and said screen is elevated, for locating said screen a predetermined image projection distance from said image source means;

a television system having an ON control mode for activating said image source means for display of said television images on said screen and for providing television sound when said screen is emerged from said cabinet, said television system including an OFF control mode for turning off said sound and pictures;

precision elevating means for raising and lowering said unitary optical assembly and said screen between a lowered, receiver-inoperable position wherein said screen is stored in said cabinet, and a raised, receiver-operable position wherein said screen is elevated from said cabinet for display of said television images, said elevating means comprising:

at least two vertically oriented, vertically stabilized screw means located on opposite ends of said cabinet, said screw means mating with associated screw follower means attached to said elevatable screen assembly;

thrust bearing means for receiving the vertical thrust of said screw means;

rotative power train means for causing said screw means to rotate in unison;

a plurality of vertically oriented guide rods in parallel relation to said screw means for stabilizing said elevatable screen assembly in its reciprocation;

reversible motor means for driving said power train means for raising and lowering said screen assembly;

said combination further including control means coupled to said elevating means and said television system for sensing the position of said screen and obstructions to said screen in its reciprocation and correlatively controlling said elevating means and the OFF/ON control modes of said television system, said control means including:

means for sensing the raising of said screen from said lowered position and activating said television ON control mode;

means for sensing an obstruction to the elevating and lowering of said screen, and control means for turning off said television system and said motor in response;

means for sensing the proximity of said screen to said raised position and controlling the speed of said motor in response;

means for detecting the raised position of said screen and providing for OFF/ON control of only said television system;

means for sensing said raised and lowered positions of said screen and control means for stopping and reversing said motor at said positions;

means for sensing said lowered position of said screen and activating said OFF control mode of said television system; and, means for detecting the lowered position of said screen and control means for turning off said motor so that said screen does not rise during an automatic programming mode;

said control means being programmed to cause said screen to rise smoothly to viewing position without an abrupt stop, the picture appears and sound is heard at the instant the viewing position is attained, safety is enhanced as obstructions to screen excursion are sensed, and the receiver is automatically in the off mode when the screen is stored.

6. The receiver defined by claim 5 wherein said screw means of said elevating means comprises four screws, two of which are located at each of said ends of said cabinet.

* * * * *